US009668120B2

(12) United States Patent
Home

(10) Patent No.: US 9,668,120 B2
(45) Date of Patent: May 30, 2017

(54) BULK RE-REGISTRATION TO ANOTHER MSC-VLR

(75) Inventor: Sandra Home, Plano, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1120 days.

(21) Appl. No.: 13/480,567

(22) Filed: May 25, 2012

(65) Prior Publication Data

US 2013/0316704 A1 Nov. 28, 2013

(51) Int. Cl.
*H04W 4/00* (2009.01)
*H04W 8/12* (2009.01)
*H04W 8/04* (2009.01)
*H04W 92/24* (2009.01)

(52) U.S. Cl.
CPC ............... *H04W 8/12* (2013.01); *H04W 8/04* (2013.01); *H04W 92/24* (2013.01)

(58) Field of Classification Search
None
See application file for complete search history.

(56) References Cited

U.S. PATENT DOCUMENTS

2004/0248592 A1* 12/2004 Turina et al. ............. 455/461
2008/0004014 A1* 1/2008 Palviainen ............. 455/435.1
2009/0209252 A1* 8/2009 Han et al. ............. 455/433
2010/0190492 A1* 7/2010 Jiang ............. 455/432.1
2012/0129524 A1* 5/2012 Swanson ............. H04W 24/04 455/435.1

OTHER PUBLICATIONS

3GPP. 3rd Generation Partnership Project; Technical Specification Group Services and System Aspects; Intra-domain Connection of Radio Access Network (RAN) nodes to multiple Core Network (CN) nodes (Release 1 0). 3GPP TS 23.236 v10.3.0, Mar. 8, 2012 (Mar. 8, 2012), pp. 1-39, XP050555334.
3GPP. 3rd Generation Partnership Project; Technical Specification Group Core Network and Terminals; Mobile Application Part (MAP) specification (Release 11). 3GPP TS 29.002 v11.2.0 (Mar. 2012) Mar. 8, 2012, p. 1,108-176,457-538, XP055089291, Retrieved from the Internet: URL:http://www.3gpp.org/ftp/Specs/archive/29_series/29.002/29002-b20.zip.

(Continued)

*Primary Examiner* — German J Viana Di Prisco

(57) ABSTRACT

An MSC-VLR of a wireless telecommunications network also having an HLR and at least a second MSC-VLR and a plurality of mobiles. The MSC-VLR includes a network interface unit which communicates with the network. The MSC-VLR includes a processing unit that is in communication with the network interface unit and which produces a message that is sent to the HLR through the network from the network interface unit which causes the HLR to re-register at least two mobiles which are registered in the HLR for the second MSC-VLR to the MSC-VLR. An HLR of a wireless telecommunications network also having an MSC-VLR and at least a second MSC-VLR and a plurality of mobiles. A method of re-registering mobiles to an MSC-VLR of a wireless telecommunications network also having an HLR from a second MSC-VLR and a plurality of mobiles.

20 Claims, 2 Drawing Sheets

(56) References Cited

OTHER PUBLICATIONS

3GPP. Interoperability Specification (IOS) for MSC Pool Network. 3GPP2 Draft; A.S0018-0, 3rd Generation Partnership Project 2, 3gpp2, 2500 Wilson Boulevard, suite 300, Arlington, Virginia 22201, USA vol. TSGA, No. v1.0 Dec. 15, 2009 (Dec. 15, 2009), pp. 1-30, XP062112725, Retrieved from the Internet: URL:http://ftp.3gpp2.org/TSGA/Working/Standards/A.S0018-0-(MSCPooi)-TIA-1180/A.S0018-0-v1.0-TIA-1180/2009-121 O-A.S0018-0-v1.0-pub/ [retrieved on Dec. 15, 2009].

3GPP. Mobile Application Part (MAP). 3GPP2 Standard; X.50004-540-E, 3rd Generation Partnership Project 2, 3gpp2, 2500 Wilson Boulevard, suite 300, Arlington, Virginia 22201, USA, Vol. TSGX, No. v2.0, Aug. 8, 2007 (Aug. 8, 2007), pp. 1-192, XP0620 13367, [retrieved on Aug. 8, 2007].

3GPP2 X.S0004-540-E v 2.0; 3rd Generation Partnership Project 2; Mobile Application Part (MAP)—Operations Signaling Protocols; Jul. 2007.

3GPP2 S.40136-0 Version 2.0; 3rd Generation Partnership Project 2; System Requirements for MSC Pool; Nov. 5, 2009.

\* cited by examiner

BULK RE-REGISTRATION TO ANOTHER MSC-VLR

TECHNICAL FIELD

The present invention is related to the re-registration at least two mobiles at the same time in a home location register (HLR) from one mobile switching center-visitor location register (MSC-VLR) to another MSC-VLR. (As used herein, references to the "present invention" or "invention" relate to exemplary embodiments and not necessarily to every embodiment encompassed by the appended claims.) More specifically, the present invention is related to a message that is sent to the HLR which causes the HLR to re-register all the mobiles which are registered in the HLR for one MSC-VLR to another MSC-VLR.

BACKGROUND

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

With the introduction of the MSC Pooling standard, several Serving MSCs (MSC-VLR) within a Pool share a broad access area. Mobiles roaming into the access area covered by the MSC Pool are directed to a selected MSC-VLR based on a defined routing algorithm. In the event that one of the MSC-VLR is taken out of service, the mobiles being served by the out of service MSC-VLR needs to be re-homed to another MSC-VLR. In order for these mobiles to receive new calls, they must be re-registered at the HLR to the other MSC-VLR. In addition, it is a system design goal for MSC Pooling, from the S.R0136-0 v2.0 standard, to minimize the interruption time for users that are registered in a MSC that breaks down.

Re-homing mobiles based on a non-triggered re-registration to another MSC-VLR may require a significant amount of time for all the mobiles to re-register. During this time, mobiles not yet re-registered would not receive calls.

Re-homing mobiles using a solution that involves proactively triggering registration notifications to the HLR via a form of mobile probing (e.g., paging) would require managing the impact to the access capacity by staggering the re-homing; and would expect to take several hours. During this time, mobiles not yet re-registered would not receive calls.

BRIEF SUMMARY OF THE INVENTION

The present invention pertains to an MSC-VLR of a wireless telecommunications network also having an HLR and at least a second MSC-VLR and a plurality of mobiles. The MSC-VLR comprises a network interface unit which communicates with the network. The MSC-VLR comprises a processing unit that is in communication with the network interface unit and which produces a message that is sent to the HLR through the network from the network interface unit which causes the HLR to re-register at least two mobiles which are registered in the HLR for the second MSC-VLR to the MSC-VLR.

The present invention pertains to a method of re-registering mobiles to an MSC-VLR of a wireless telecommunications network also having an HLR from a second MSC-VLR and a plurality of mobiles. The method comprises the steps of producing a message with a processing unit of the MSC-VLR. There is the step of sending the message to the HLR through the network from a network interface unit of the MSC-VLR which causes the HLR to re-register at least two mobiles which are registered in the HLR for the second MSC-VLR to the MSC-VLR.

The present invention pertains to an HLR of a wireless telecommunications network also having an MSC-VLR and at least a second MSC-VLR and a plurality of mobiles. The HLR comprises a network interface unit which communicates with the network and receives a message from the MSC-VLR to re-register at least two mobiles which are registered in the HLR for the second MSC-VLR to the MSC-VLR. The HLR comprises a processing unit that is in communication with the network interface unit which re-registers the two mobiles to the MSC-VLR from the second MSC-VLR The present invention pertains to a method of re-registering mobiles to an MSC-VLR of a wireless telecommunications network also having an HLR from a second MSC-VLR and a plurality of mobiles. The method comprises the steps of receiving a message at a network interface unit of the HLR from the MSC-VLR to re-register at least two mobiles which are registered in the HLR for the second MSC-VLR to the MSC-VLR. There is the step of re-registering with a processing unit of the HLR the two mobiles to the MSC-VLR from the second MSC-VLR.

BRIEF DESCRIPTION OF THE DRAWING

In the accompanying drawings, the preferred embodiment of the invention and preferred methods of practicing the invention are illustrated in which.

DETAILED DESCRIPTION

Figure 1:
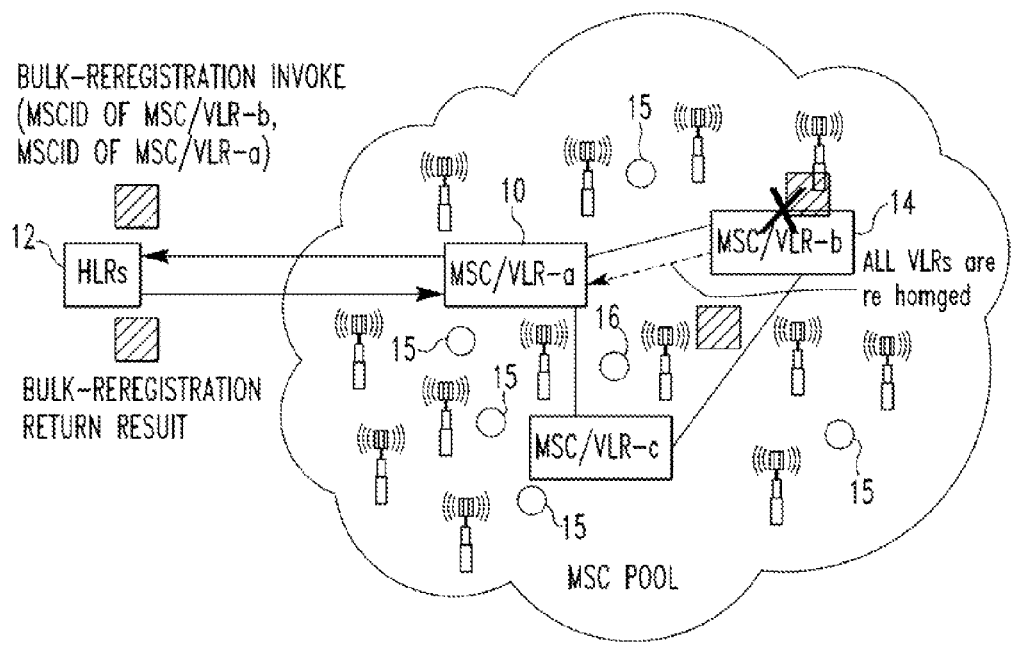
FIG. 1 is a schematic representation of the present invention.
Figure 3:
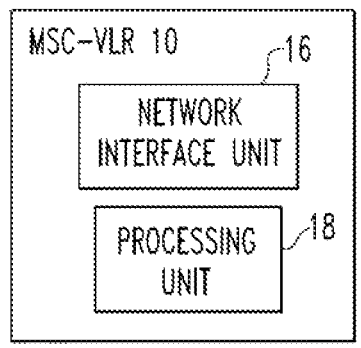
FIG. 3 is a block diagram of an MSC-VLR of the present invention.

Referring now to the drawings wherein like reference numerals refer to similar or identical parts throughout the several views, and more specifically to FIGS. 1 and 3 thereof, there is shown an MSC-VLR 10 of a wireless telecommunications network also having an HLR 12 and at least a second MSC-VLR 14 and a plurality of mobiles 15. The MSC-VLR 10 comprises a network interface unit 16 which communicates with the network. The MSC-VLR 10 comprises a processing unit 18 that is in communication with the network interface unit 16 and which produces a message that is sent to the HLR 12 through the network from the network interface unit 16 which causes the HLR 12 to re-register at least two mobiles 15 which are registered in the HLR 12 for the second MSC-VLR 14 to the MSC-VLR 10.

The message the processing unit 18 produces may cause the HLR 12 to re-register all the mobiles 15 which are registered in the HLR 12 for the second MSC-VLR 14 to the first MSC-VLR 10. The network interface unit 16 may receive profile information for the re-registered mobiles 15. The network interface unit 16 may receive a confirmation request from the HLR 12 regarding the re-registration of the mobiles 15. The message may be an ANSI-41 message.

The present invention pertains to a method of re-registering mobiles 15 to an MSC-VLR 10 of a wireless telecommunications network also having an HLR 12 from a second MSC-VLR 14 and a plurality of mobiles 15. The method comprises the steps of producing a message with a processing unit 18 of the MSC-VLR 10. There is the step of sending the message to the HLR 12 through the network from a network interface unit 16 of the MSC-VLR 10 which causes the HLR 12 to re-register at least two mobiles 15 that are registered in the HLR 12 for the second MSC-VLR 14 to the MSC-VLR 10.

The producing step may include the step of producing the message which causes die HLR 12 to re-register all the mobiles 15 which are registered in the HLR 12 for the second MSC-VLR 14 to the first MSC-VLR 10. There may be the step of the network interface unit 16 receiving profile information for the re-registered mobiles 15. There may be the step of the network interface unit 16 receiving a confirmation request from the HLR 12 regarding the re-registration of the mobiles 15. The message may be an ANSI-41 message.

Figure 4:
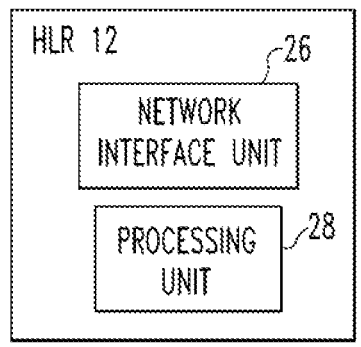
FIG. 4 is a block diagram of an HLR of the present invention.

The present invention pertains to an HLR 12, as shown in FIG. 4, of a wireless telecommunications network also having an MSC-VLR 10 and at least a second MSC-VLR 14 and a plurality of mobiles 15. The HLR 12 comprises a network interface unit 26 which communicates with the network and receives a message from the MSC-VLR 10 to re-register at least two mobiles 15 which are registered in the HLR 12 for the second MSC-VLR 14 to the MSC-VLR 10. The HLR 12 comprises a processing unit 28 that is in communication with the network interface unit 26 which re-registers the two mobiles 15 to the MSC-VLR 10 from the second MSC-VLR.

The message may be to re-register all the mobiles 15 which are registered in the HLR 12 for the second MSC-VLR. 14 to the first MSC-VLR 10. The processing unit 28 may re-register at least one of the mobiles 15 to the MSC-VLR 10 and at least one of the mobiles 15 to a third MSC-VLR. The processing unit 28 may produce a confirmation message regarding the re-registration of the mobiles 15 that is sent from the network interface unit 26 through the network to the MSC-VLR 10. The message may be an ANSI-41 message. The re-registration of the mobile(s) to a different/new MSC-VLR in the HLR allows calls/SMS msgs to the mobile(s) to be delivered to the new MSC-VLR. If the MSC-VLR does not have the mobile's profile when the first call after is delivered, it would be explicitly requested at that time. Basically, everything associated with the MSC location knowledge of the mobile would expect to use the new MSC-VLR after.

The present invention pertains to a method of re-registering mobiles 15 to an MSC-VLR 10 of a wireless telecommunications network also having an HLR 12 from a second MSC-VLR 14 and a plurality of mobiles 15. The method comprises the steps of receiving a message at a network interface unit 26 of the HLR 12 from the MSC-VLR to re-register at least two mobiles 15 which are registered in the HLR 12 for the second MSC-VLR 14 to the MSC-VLR 10. There is the step of re-registering with a processing unit 28 of the HLR 12 the two mobiles 15 to the MSC-VLR 10 from the second MSC-VLR 14.

The receiving step may include the step of receiving the message which is to re-register all the mobiles 15 which are registered in the HLR 12 for the second MSC-VLR 14 to the first MSC-VLR 10. There may be the step of the processing unit 28 re-registering at least one of the mobiles 15 to the MSC-VLR 10 and at least one of the mobiles 15 to a third MSC-VLR. There may be the step of the processing unit 28 sending from the network interface unit 26 through the network to the MSC-VLR 10 a confirmation request regarding the re-registration of the mobiles 15. The message may be an ANSI-41 message.

In the operation of the invention, the basic concept of this invention is to provide a solution to quickly re-home all of the mobiles 15, being served by the out of service MSC-VLR, so that there is minimal interruption time for these mobile to receive new calls. The invention introduces a new message that is sent to the HLRs 12 from one of the in-service MSC-VLR in the Pool. This message is used to immediately re-register all the mobiles 15 from the out of service MSC-VLR to another MSC-VLR(s) in the MSC Pool.

When a MSC-VLR within a MSC Pool is taken out of service (either manually or due to failure), all the Mobiles 15 being served by that MSC-VLR need to be re-homed to another MSC-VLR(s) within the same MSC Pool to maintain service for the affected mobiles 15. To minimize service disruption, a method to quickly re-home the mobiles 15 to another MSC-VLR requires that the HLRs 12 be notified immediately of the MSC-VLR change.

CDMA is used in the following detailed description of this invention, but it may be applied to other applicable technologies such as GSM. It may also be applicable in other multi-server scenarios where a central database is accessed to provide the current server assigned to a particular user. The Bulk Re-registration message is provided only as an example of a new ANSI-41 message to illustrate how the invention could be applied.

A new Bulk Re-registration ANSI-41 message would be used to inform the HLRs 12 that the location data for all the mobiles 15 associated with an out-of-service MSC-VLR needs to be updated to the in-service MSC-VLR. The Bulk Re-registration message contains the old MSCID of out-of-service MSC and the MSCID for the in-service MSC taking over. When a HLR 12 receives the Bulk-Re-registration message, it updates the location information for all mobiles 15 currently registered in the old serving MSCID to the new serving MSCID. Once the HLR 12 has updated the location information, the mobiles 15 remain registered to the HLR 12 and new calls will be delivered to the new MSC-VLR. Profile information for these re-registered mobiles 15 will be sent to the new MSC-VLR on next mobile access (i.e., registration, origination, termination, etc.).

1. A MSC-VLR in the MSC Pool goes out of service
2. Another in-service MSC-VLR in the MSC Pool initiates re-homing of all the mobiles 15 being served by the out of service MSC-VLR.
3. The in-service MSC-VLR sends a Bulk Re-registration ANSI-41 message to the HLRs 12 to request that all the mobiles 15 that are registered to the out-of-service MSC-VLR be updated to be registered to the in-service MSC-VLR.
4. The HLRs 12 confirms the Bulk Re-registration request to the invoking in-service MSC-VLR.

The previous example illustrated the usage of the new Bulk Re-registration ANSI-41 message to register all the mobiles 15 from an out-of-service MSC to a single in-service MSC. However, multiple in-service MSCs in a MSC Pool could also be specified to take over the registered mobiles 15 from the out-of-service MSC. In this case, one of the MSC-VLR would send the request to the HLRs 12 and the HLRs 12 would evenly divide the mobiles 15 to be updated between the all the new MSCs included in the request. This alternative would be used to load share the mobiles 15 from the out-of-service MSC to several MSCs within the MSC Pool.

This Bulk Re-registration (BULKREREG) operation is used by a VLR to inform the HLR 12 that all mobiles 15 registered to a MSC-VLR needs to be updated to be registered to a new MSC-VLR(s).

|  | INVOKING FE | RESPONDING FE |
| --- | --- | --- |
| Case 1 | Serving VLR | HLR |

The Bulk Re-registration operation is initiated with a TCAP INVOKE (LAST). This is carried by a TCAP QUERY WITH PERMISSION package. The Parameter set is encoded as follows:

| Bulk Re-registration INVOKE Parameters | | | | |
| --- | --- | --- | --- | --- |
| Field | Value | Type | Reference | Timer: Notes |
| Identifier | SET [NATIONAL 18] | M | | |
| Length | variable octets | M | | |
| Contents | | | | |
|  | MSCID (Old Serving) | M | 2.151 | |
|  | MSCIDList (New Serving) | M | See below | |

The MSCIDList parameter is used to provide the HLR 12 with one or more new MSC-VLR(s) to re-register the mobiles 15 to.

| Field | Value | Type | Reference | Notes |
| --- | --- | --- | --- | --- |
| Identifier | MSCIDList IMPLICIT SET OF | M | | |
| Length | variable octets | M | | |
| Contents | | | | |
|  | MSCID | M | 2.151 | |
|  | MSCID | O | 2.151 | a |
|  | . . . | | | |

The Bulk Re-registration operation success is reported with a TCAP RETURN RESULT (LAST). This is carried by a TCAP RESPONSE package. The Parameter set is encoded as follows:

| Bulk Re-registration RETURN RESULT Parameters | | | | |
| --- | --- | --- | --- | --- |
| Field | Value | Type | Reference | Notes |
| Identifier | SET [NATIONAL 18] | M | | |
| Length | variable octets | M | | |
| Contents | | | | |

Figure 2:
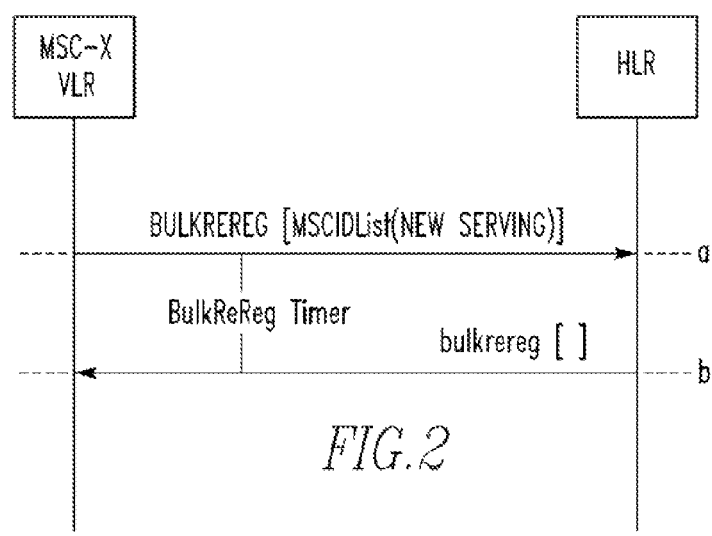
FIG. 2 is a signaling diagram of the present invention.

This scenario describes the normal use of the Bulk Re-Registration operation, as shown in FIG. 2.

a. The MSC-VLR/VLR sends a BULKREREG to the HLR 12 to, inform the HLR 12 that all mobiles 15 registered in MSCID (Old Serving) needs to be updated to be registered in MSCIDList (New Serving).

| Parameters | Usage | Type |
| --- | --- | --- |
| MSCID (Old Serving) | Old Serving MSC MSCID | R |
| MSCIDList (New Serving) | New Serving MSC MSCID List | R | b. The HLR 12 acknowledges receipt of the BULKREREG via an empty bulkrereg.

The re-registration message provides a quick low impact method to re-register mobiles 15 from one MSC-VLR to another MSC-VLR(s) on the HLR 12. It may be used to support MSC redundancy in MSC Pooling by enabling another MSC-VLR to take over serving all the mobiles 15 that were being served by a MSC-VLR that has been taken out of service.

It may also be used for other reasons where the MSCID value of registered mobiles 15 needs to be modified in the HLR 12 without requiring a re-registration of all the mobiles 15 (e.g., changing the MSCID value of MSC-VLR).

MSC-VLR's share a common access. Basically, an MSC-VLR would need to be able to provide the service for any mobiles 15 that it was requesting the HLR to re-register to itself.

ABBREVIATIONS

CDMA Code Division Multiple Access
GSM Global System for Mobile communications
HLR Home Location Register
MSC Mobile Switching Center
MSCID Mobile Switching Center Identification
MSC Mobile Switching Center
VLR Visitor Location Register
References, all of which are incorporated by reference
ANSI-41—the standard describing the CDMA network that needs to be enhanced for this invention.
3GPP2 S.R0136-0 Version 2.0—System Requirements for MSC Pool Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A mobile switching center-visitor location register (MSC-VLR) of a wireless telecommunications network having a home location register (HLR), at least a second MSC-VLR and a plurality of mobiles, the MSC-VLR comprising:
a network interface unit configured to communicate with the network; and
a processing unit that is in communication with the network interface unit, the processing unit being configured to, in response to the second MSC-VLR going out of service, produce a bulk re-registration message that is sent to the HLR through the network from the network interface unit, the bulk re-registration message identifying the second MSC-VLR to the HLR and causing the HLR to re-register at least two mobiles, which are registered in the HLR for the second MSC-VLR, to the MSC-VLR.

2. The MSC-VLR of claim 1 wherein the bulk re-registration message the processing unit produces causes the HLR to re-register all the mobiles which are registered in the HLR for the second MSC-VLR to the first MSC-VLR.

3. The MSC-VLR of claim 1 wherein the network interface unit receives profile information for the re-registered mobiles.

4. The MSC-VLR of claim 1 wherein the network interface unit receives a confirmation request from the HLR regarding the re-registration of the mobiles.

5. The MSC-VLR of claim 1 wherein the bulk re-registration message is an ANSI-41 message.

6. A method of re-registering mobiles to a mobile switching center-visitor location register (MSC-VLR) of a wireless telecommunications network, having a home location register (HLR), from a second MSC-VLR and a plurality of mobiles, the method comprising the steps of:
   producing a bulk re-registration message with a processing unit of the MSC-VLR; and
   sending the bulk re-registration message to the HLR through the network from a network interface unit of the MSC-VLR causing the HLR to re-register at least two mobiles, which are registered in the HLR, for the second MSC-VLR to the MSC-VLR.

7. The method of claim 6 wherein the producing step includes the step of producing the bulk re-registration message which causes the HLR to re-register all the mobiles, which are registered in the HLR for the second MSC-VLR, to the first MSC-VLR.

8. The method of claim 6 including the step of the network interface unit receiving profile information for the re-registered mobiles.

9. The method of claim 6 including the step of the network interface unit receiving a confirmation request from the HLR regarding the re-registration of the mobiles.

10. The method of claim 6 wherein the bulk re-registration message is an ANSI-41 message.

11. A home location register (HLR) of a wireless telecommunications network having a mobile switching center-visitor location register (MSC-VLR), at least a second MSC-VLR and a plurality of mobiles, the HLR comprising:
   a network interface unit configured to communicate with the network and receive a bulk re-registration message from the MSC-VLR to re-register at least two mobiles, which are registered in the HLR for the second MSC-VLR, to the MSC-VLR,
   wherein the bulk re-registration message is received when the second MSC-VLR is out of service and the message identifies the second MSC-VLR to the HLR; and
   a processing unit that is in communication with the network interface unit, the processing unit being configured to re-register the two mobiles to the MSC-VLR from the second MSC-VLR.

12. The HLR of claim 11 wherein the bulk re-registration message is to re-register all the mobiles which are registered in the HLR for the second MSC-VLR to the first MSC-VLR.

13. The HLR of claim 11 wherein the processing unit re-registers at least one of the mobiles to the MSC-VLR and at least one of the mobiles to a third MSC-VLR.

14. The HLR of claim 11 wherein the processing unit produces a confirmation message regarding the re-registration of the mobiles that is sent from the network interface unit through the network to the MSC-VLR.

15. The HLR of claim 11 wherein the bulk re-registration message is an ANSI-41 message.

16. A method of re-registering mobiles to a mobile switching center-visitor location register (MSC-VLR) of a wireless telecommunications network, having a home location register (HLR), from a second MSC-VLR and a plurality of mobiles, the method comprising the steps of:
   in response to the second MSC-VLR going out of service, receiving a message at a network interface unit of the HLR from the MSC-VLR to re-register at least two mobiles, which are registered in the HLR for the second MSC-VLR, to the MSC-VLR, the message identifying the second MSC-VLR to the HLR; and
   re-registering with a processing unit of the HLR the two mobiles to the MSC-VLR from the second MSC-VLR.

17. The method of claim 16 wherein the receiving step includes the step of receiving the bulk re-registration message which is to re-register all the mobiles, which are registered in the HLR, for the second MSC-VLR to the first MSC-VLR.

18. The method of claim 16 including the step of the processing unit re-registering at least one of the mobiles to the MSC-VLR and at least one of the mobiles to a third MSC-VLR.

19. The method of claim 16 including the step of the processing unit sending from the network interface unit through the network to the MSC-VLR a confirmation request regarding the re-registration of the mobiles.

20. The method of claim 16 wherein the bulk re-registration message is an ANSI-41 message.

* * * * *